(12) United States Patent
Julin

(10) Patent No.: US 11,673,253 B2
(45) Date of Patent: Jun. 13, 2023

(54) ACTUATOR DEVICES FOR HUMAN EXOSKELETON JOINTS

(71) Applicant: Ekso Bionics, Inc., Richmond, CA (US)

(72) Inventor: Aaron Julin, Oakland, CA (US)

(73) Assignee: Ekso Bionics, Inc., San Rafael, CA (US)

( * ) Notice: Subject to any disclaimer, the term of this patent is extended or adjusted under 35 U.S.C. 154(b) by 720 days.

(21) Appl. No.: 16/491,091

(22) PCT Filed: Mar. 7, 2018

(86) PCT No.: PCT/US2018/021298
§ 371 (c)(1),
(2) Date: Sep. 4, 2019

(87) PCT Pub. No.: WO2018/165261
PCT Pub. Date: Sep. 13, 2018

(65) Prior Publication Data
US 2020/0011406 A1  Jan. 9, 2020

Related U.S. Application Data

(60) Provisional application No. 62/468,497, filed on Mar. 8, 2017.

(51) Int. Cl.
*B25J 9/00* (2006.01)
*A61H 3/00* (2006.01)
(Continued)

(52) U.S. Cl.
CPC .............. *B25J 9/0006* (2013.01); *A61H 3/00* (2013.01); *B25J 9/102* (2013.01); *B25J 9/126* (2013.01);
(Continued)

(58) Field of Classification Search
None
See application file for complete search history.

(56) References Cited

U.S. PATENT DOCUMENTS 5,620,410 A * 4/1997 Kaiser ................ A61H 1/0285
601/40
10,357,381 B2 * 7/2019 Kuiken ..................... A61F 2/64
(Continued)

*Primary Examiner* — LaToya M Louis
(74) *Attorney, Agent, or Firm* — Diederiks & Whitelaw, PLC

(57) ABSTRACT

An exoskeleton includes a first support, a second support, and a joint connecting the first and second supports. An actuator causes relative rotation between the first and second supports at the joint. The actuator includes a motor, a ball screw, a ball nut, and a yoke. The motor causes translation of the yoke via the ball screw and the ball nut. In some embodiments, the actuator further includes a roller and a joint cam having a track. Translation of the yoke causes movement of the roller within the track, and movement of the roller within the track causes rotation of the joint cam. In other embodiments, the actuator further includes a linkage and a joint crank. Translation of the yoke causes movement of the linkage, and movement of the linkage causes rotation of the joint crank. Rotation of the joint cam or the joint crank causes relative rotation between the first and second supports.

14 Claims, 20 Drawing Sheets

(51) Int. Cl.
*B25J 9/10* (2006.01)
*B25J 9/12* (2006.01)
*F16H 25/20* (2006.01)

(52) U.S. Cl.
CPC ....... *F16H 25/20* (2013.01); *A61H 2003/007* (2013.01); *A61H 2201/1215* (2013.01); *A61H 2201/163* (2013.01); *A61H 2201/165* (2013.01); *A61H 2201/1638* (2013.01); *A61H 2201/1642* (2013.01); *A61H 2201/1671* (2013.01); *F16H 2025/2043* (2013.01)

(56) References Cited

U.S. PATENT DOCUMENTS

| | | | |
|---|---|---|---|
| 10,456,286 B2 * | 10/2019 | Plecnik | A61F 5/013 |
| 11,191,653 B2 * | 12/2021 | Grandmaison | A61H 3/00 |
| 2011/0040216 A1 | 2/2011 | Herr et al. | |
| 2011/0067518 A1 | 3/2011 | Park et al. | |
| 2015/0351995 A1 | 12/2015 | Zoss et al. | |
| 2016/0113831 A1 | 4/2016 | Hollander | |
| 2018/0055712 A1 * | 3/2018 | Gayral | A61H 1/0266 |
| 2018/0172121 A1 * | 6/2018 | Potter | B62D 57/032 |
| 2019/0203815 A1 * | 7/2019 | Laffranchi | F16H 25/2204 |

* cited by examiner

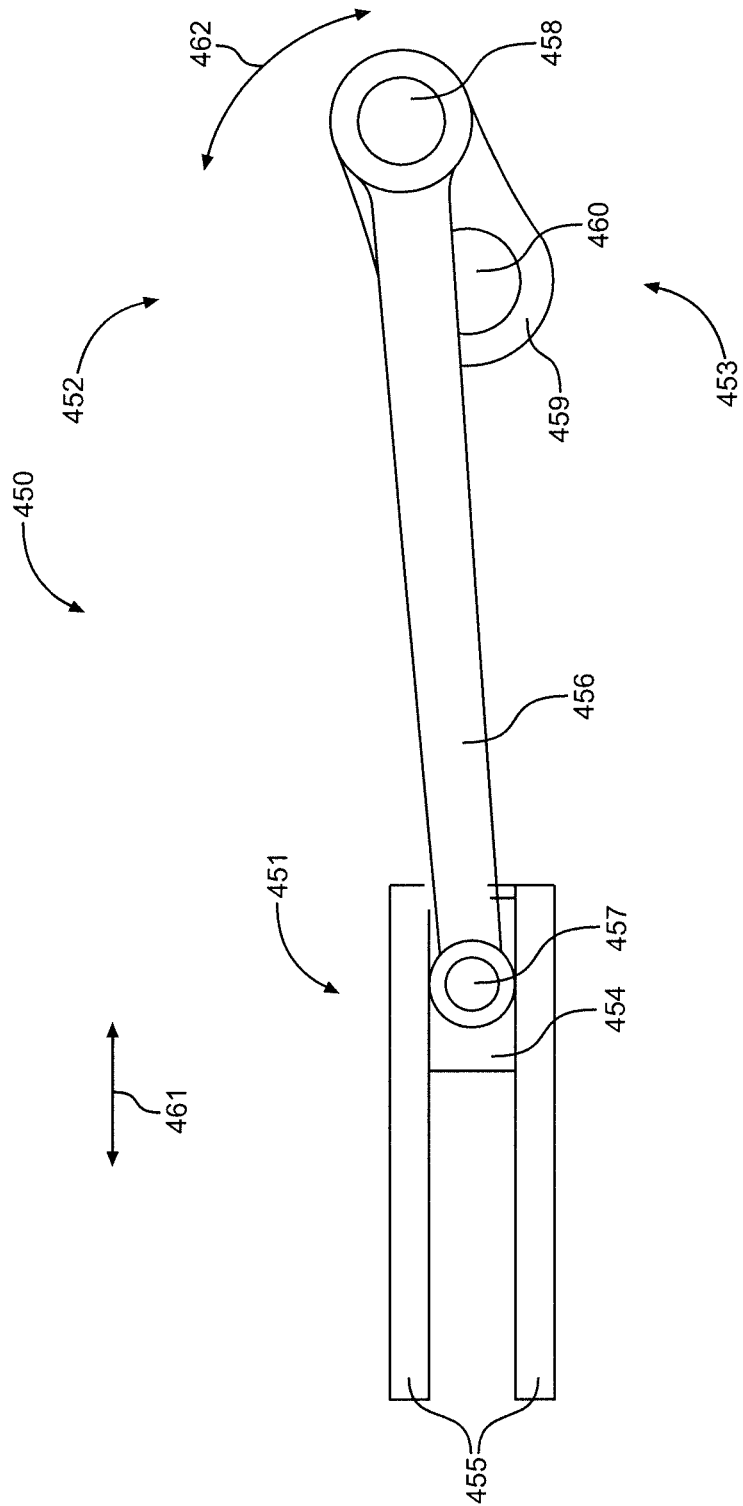

ACTUATOR DEVICES FOR HUMAN EXOSKELETON JOINTS

CROSS REFERENCE TO RELATED APPLICATIONS

This application represents a National Stage Application of PCT/US2018/021298, filed Mar. 7, 2018 and titled "Actuator Devices for Human Exoskeletons", which claims the benefit of U.S. Provisional Application No. 62/468,497, which was filed on Mar. 8, 2017 and titled "Actuator Devices for Human Exoskeleton Joints". The entire content of these applications are incorporated herein by reference.

FIELD OF THE INVENTION

The present invention relates to a device that augments a user's strength and/or aids in the prevention of injury during the performance of certain motions or tasks. More particularly, the present invention relates to a device suitable for therapeutic use with patients that have impaired neuromuscular/muscular function of the appendages or a device suitable for use by a person engaging in heavy tool use or weight-bearing tasks. These devices include a set of artificial limbs, with these artificial limbs being movable by actuators under the direction of control systems, that potentiate improved function of the wearer's appendages for activities including, but not limited to, enabling walking for a disabled person, granting greater strength and endurance in a wearer's arms, or allowing for more weight to be carried by a wearer while walking.

BACKGROUND OF THE INVENTION

Wearable exoskeletons have been designed for medical, commercial, and military applications. Medical exoskeletons are being developed to restore and rehabilitate proper muscle function for people with disorders that affect muscle control. Medical exoskeletons are systems of motorized braces that can apply forces to the wearer's appendages. In a rehabilitation setting, medical exoskeletons are controlled by a physical therapist who uses one of a plurality of possible input means to command an exoskeleton control system. In turn, the medical exoskeleton control system actuates the position of the motorized braces, resulting in the application of force to, and typically movement of, the body of the exoskeleton wearer. Medical exoskeletons can also be used outside of a therapeutic setting to grant improved mobility to a disabled individual. Commercial and military exoskeletons help prevent injury and augment the exoskeleton wearer's strength. Commercial and military exoskeletons are used to alleviate loads supported by workers or soldiers during their labor or other activities, thereby preventing injuries and increasing a wearer's stamina and strength. Tool-holding exoskeletons are outfitted with a tool-holding arm that supports the weight of a tool, reducing user fatigue by providing tool holding assistance. The tool-holding arm transfers the vertical force required to hold the tool through the legs of the exoskeleton rather than through the user's arms and body. Similarly, weight-bearing exoskeletons transfer the weight of the exoskeleton load through the legs of the exoskeleton rather than through the exoskeleton wearer's legs. In some cases, weight-bearing exoskeletons are designed to carry a specific load, such as a heavy backpack. In other cases, military weight-bearing exoskeletons support the weight of armor. Commercial and military exoskeletons can have actuated joints that augment the strength of the exoskeleton wearer, with these actuated joints being controlled by the exoskeleton control system, and with the exoskeleton wearer using any of a plurality of possible input means to command the exoskeleton control system.

In powered exoskeletons, exoskeleton control systems prescribe and control trajectories in the joints of an exoskeleton, resulting in the movement of the exoskeleton. These control trajectories can be prescribed as position-based, force-based, or a combination of both methodologies, such as those seen in impedance controllers. Position-based control systems can be modified directly through modification of the prescribed positions. Force-based control systems can also be modified directly through modification of the prescribed force profiles. Complicated exoskeleton movements, such as walking in an ambulatory medical exoskeleton, are commanded by an exoskeleton control system through the use of a series of exoskeleton trajectories, with increasingly complicated exoskeleton movements requiring an increasingly complicated series of exoskeleton trajectories. These series of trajectories can be cyclic, such as the exoskeleton taking a series of steps with each leg, or they can be discrete, such as an exoskeleton rising from a seated position into a standing position. In the case of an ambulatory exoskeleton, during a rehabilitation session and/or over the course of rehabilitation, it is highly beneficial for the physical therapist to have the ability to modify the prescribed positions and/or the prescribed force profiles depending on the particular physiology or rehabilitation stage of a patient. As various exoskeleton wearers may be differently proportioned, variously adjusted or customized powered exoskeletons will fit each wearer somewhat differently. The exoskeleton control system should take into account these differences in wearer proportion, exoskeleton configuration/customization, and exoskeleton-wearer fit, resulting in changes to prescribed exoskeleton trajectories.

While exoskeleton control systems assign trajectories to the joints of the exoskeleton and control the positions of these joints, the actual forces applied to exoskeleton joints are exerted by actuators. These actuators can take many forms, as is known in the art, each with advantages and disadvantages in various applications. In current exoskeletons, the actuator exerting force on a joint typically includes an electric motor and drive mechanism located proximal to that joint. Co-location of the actuator with the joint has advantages in terms of mechanical and design simplicity, but it has certain disadvantages—foremost among them is that adding a motor at or near a joint increases the bulk of the joint, limiting maneuverability of the joint and exoskeleton in certain environments.

In biological joints, muscles exert force by shortening their length, resulting in translation of the tensile member (tendon) exerting force over distance. As an example, consider a human finger: the musculature exerting force on the joints of the finger is not located near the joints of the finger but rather in the forearm, with muscular contraction pulling on tendons that relay that force over distance to the joints of the finger. This has the advantage of minimizing the bulk of the fingers, allowing for both greater dexterity and closer placement of the fingers to each other. Exoskeleton robotic actuators have been developed that use tensile members to transmit force over distance from an electric motor to a joint, such as that described in U.S. Pat. No. 4,843,921. One disadvantage of the use of tensile members to transfer force from a motor (or muscle) to a joint is that tensile members, which cannot act as compression members, can only be used to pull. As a result, single motor/tensile member systems can only apply monodirectional force upon a joint, requiring either a second motor/tensile member or a device such as a spring to apply counteracting force on the joint. A second disadvantage to the use of tensile member actuators in exoskeletons is that the failure (i.e., breakage) of a tensile member (e.g., due to wear) can result in uncontrolled movement of a joint and injury to an exoskeleton wearer.

There exists an unmet need to provide a device for use in human exoskeletons that allows for force to be exerted upon a joint, effecting bidirectional movement of the joint, with this device being located away from the joint. There further exists a need for this device to allow for the application of bidirectional force upon an exoskeleton joint, effecting bidirectional movement of the joint. There further exists a need for this device to be highly efficient at the transfer of force from an electrical motor, or other power source, to the joint, minimizing energy consumption and/or maximizing force applied to the joint. There further exists a need for this device to be low profile and add little bulk at the joint being powered. There further exists a need for this device to be capable of generating substantial mechanical advantage in a small space. There further exists a need for this device to incorporate a robust and simple system for force sensing, allowing the exoskeleton control system to accurately control the position of and the force applied to the joint. There further exists a need for this device to contain no failure-prone components (e.g., tensile members), allowing for improved exoskeleton wearer safety.

SUMMARY OF THE INVENTION

It is an object of the present invention to provide a device that meets these needs. Concepts were developed for an exoskeleton joint actuator device where the actuator's main drive mechanism is a ball screw, with this ball screw being driven by an electric motor. The ball nut of this device is attached to a yoke, with this yoke acting as a translating follower constrained within the track of a form-closed joint cam. The yoke is further constrained by a guide, with rollers mounted on the yoke traveling within the guide such that movement of the yoke is constrained and oriented to be axial with the movement of the ball screw. Axial thrust generated by the movement of the ball nut along the ball screw results in translation of the yoke, applying force to the joint cam, and effecting the rotational movement of the joint cam. The configuration of this device is such that bidirectional movements of the ball nut result in bidirectional movements of the joint cam, allowing a single drive mechanism to affect bidirectional movements of a joint over a distance from that joint.

Concepts were further developed for the inclusion of a load cell in the ball screw-driven joint cam actuator device, with this load cell providing information to an exoskeleton control system about the bidirectional force being exerted by the actuator device on the joint of the exoskeleton.

Concepts were further developed for the use of a ball screw-driven joint cam actuator device to power the hip joint of a human exoskeleton, with this device being low profile at the hip. Concepts were further developed for use of the ball screw-driven joint cam actuator device at other exoskeleton joints including, but not limited to, the knee, ankle, and elbow.

Based on these concepts, prototype human exoskeleton hip actuation devices were developed, with these devices being comprised of electric motor-driven ball screw mechanisms mounted above the exoskeleton hip. Linear movement of the ball nut results in translation of a yoke, with this yoke interacting, by means of a roller, with a joint cam. The translation of this yoke results in rotation of the joint cam such that bidirectional linear movement of the ball nut along the ball screw results in bidirectional rotational movement at the hip joint. A bidirectional load cell is incorporated into the device between the electric motor and ball screw, with this load cell being in communication with the exoskeleton control system. The exoskeleton control system is also in communication with the electric motor that drives the ball screw mechanism.

In addition, concepts were developed for an exoskeleton joint actuator device in which the actuator's main drive mechanism is a ball screw, with this ball screw being driven by an electric motor. The ball nut of this device is attached to a yoke, with the yoke acting as a translating slider. The slider is attached to a linkage, with the linkage being attached to a joint crank. Movement of the yoke is constrained by a guide, with rollers mounted on the yoke traveling within the guide such that the movement of the yoke is oriented to be axial with the movement of the ball screw. Axial thrust generated by the movement of the ball nut along the ball screw results in translation of the yoke, applying force to the linkage, with force being transferred by the linkage to the joint crank, effecting rotational movement of the joint crank. The configuration of this device is such that bidirectional movements of the ball nut result in bidirectional movements of the joint crank, allowing a single drive mechanism to effect bidirectional movements of a joint over a distance from that joint.

Concepts were further developed for the inclusion of a load cell in the ball screw-driven in-line slider crank linkage joint actuator device, with this load cell providing information to an exoskeleton control system about the bidirectional force being exerted by the actuator device on the joint of the exoskeleton.

Concepts were further developed for the use of a ball screw-driven in-line slider crank linkage joint actuator device to power the hip joint of a human exoskeleton, with this device being low profile at the hip. Concepts were further developed for use of the ball screw-driven in-line slider crank linkage joint actuator device at other exoskeleton joints including, but not limited to, the knee, ankle, and elbow.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 5B is a simplified representation of an example in-line slider crank linkage mechanism, with this mechanism being shown in a different position relative to that shown in FIG. 5A.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

A ball screw is a mechanical device that allows rotational motion to be converted into linear motion. These devices, such as those described in U.S. Pat. Nos. 2,855,791 and 3,667,311 (both of which are incorporated herein by reference), or other forms known in the art, are comprised of a threaded shaft that acts as a raceway for ball bearings and a nut that moves over the ball bearings as it travels along the threaded shaft. The translation of the ball nut along the length of the shaft is driven by the rotation of the threaded shaft. These devices have mechanisms to allow the recirculation of ball bearings within the ball nut as the ball nut moves along the threaded shaft. Ball screw devices are used in automotive steering, aircraft and missile control surfaces, and robotics systems—including high-precision robotic systems such as those used in semiconductor manufacturing. Ball screw devices are a highly efficient way to convert force applied by an electric motor into axial thrust. Ball screws are designed for only straight-line axial thrust, with any type of transverse force or side load greatly reducing ball screw life and rapidly decreasing mechanical efficacy prior to failure. To prevent side loads, ball screw actuators include devices such as precision rails and/or linear bearings, or other similar devices known in the art. The devices to prevent side load tend to be substantial in relation to the ball screw, increasing the size and weight of the actuator system—both undesirable characteristics in exoskeleton applications.

Figure 1A:
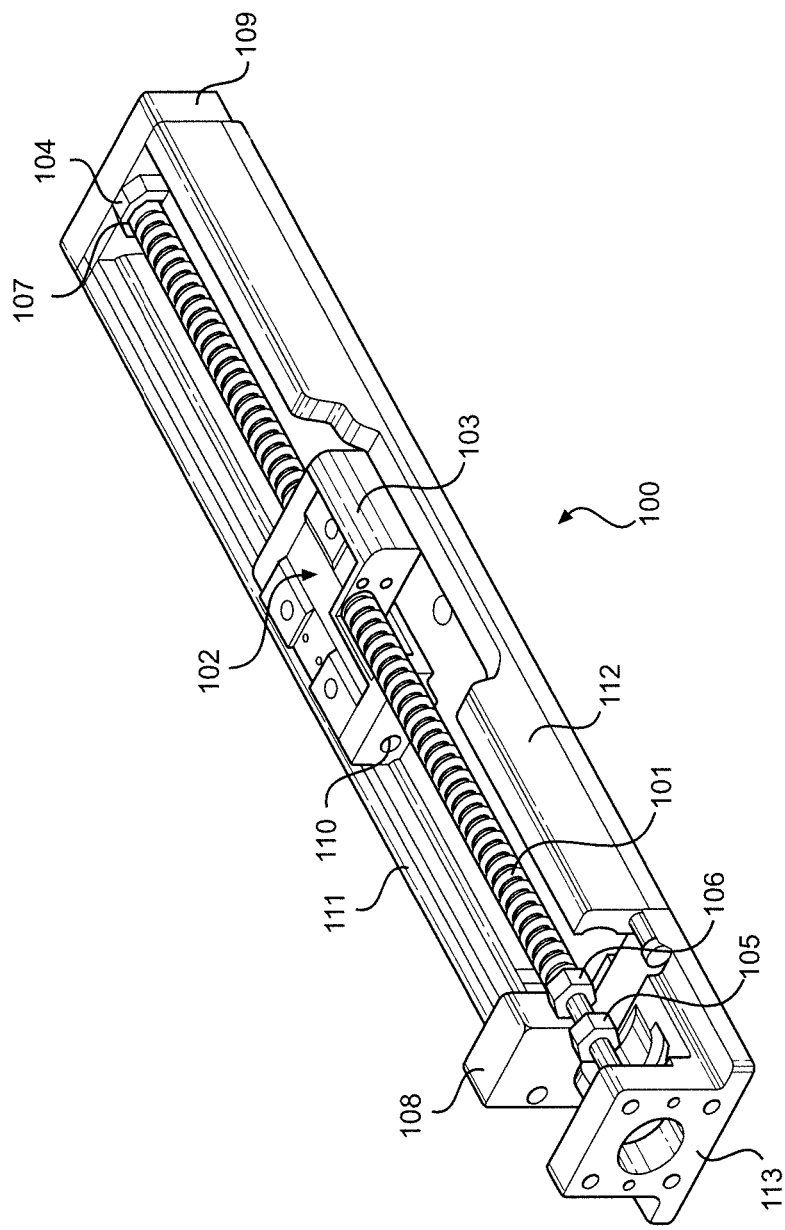
FIG. 1A is a perspective view of an example ball screw linear actuator.

With reference to FIG. 1A, an example of a ball screw linear actuator is shown, with a linear actuator 100 including a ball screw 101. Ball screw 101 is rotatably connected to a rear actuator housing 109 by a rear bearing 104 and to a front actuator housing 108 by a front bearing 105. A ball nut 102 travels along ball screw 101 between a rear stopper 107 and a front stopper 106. Ball nut 102 has a ball bearing recirculation mechanism 103 and a grease nipple 110. Ball nut 102 is guided along ball screw 101 between an outer precision rail 111 and an inner precision rail 112. A motor (not shown) can be attached to linear actuator 100 at a motor mount 113, with such a motor driving the rotation of ball screw 101. The rotation of ball screw 101 results in movement of ball nut 102 along ball screw 101 between outer precision rail 111 and inner precision rail 112. As ball nut 102 moves along ball screw 101, ball bearings (not shown) roll between ball screw 101 and ball nut 102, with ball nut recirculation mechanism 103 returning the ball bearings to ball nut 102 while grease nipple 110 provides lubrication for the ball screw mechanism.

Figure 1B:
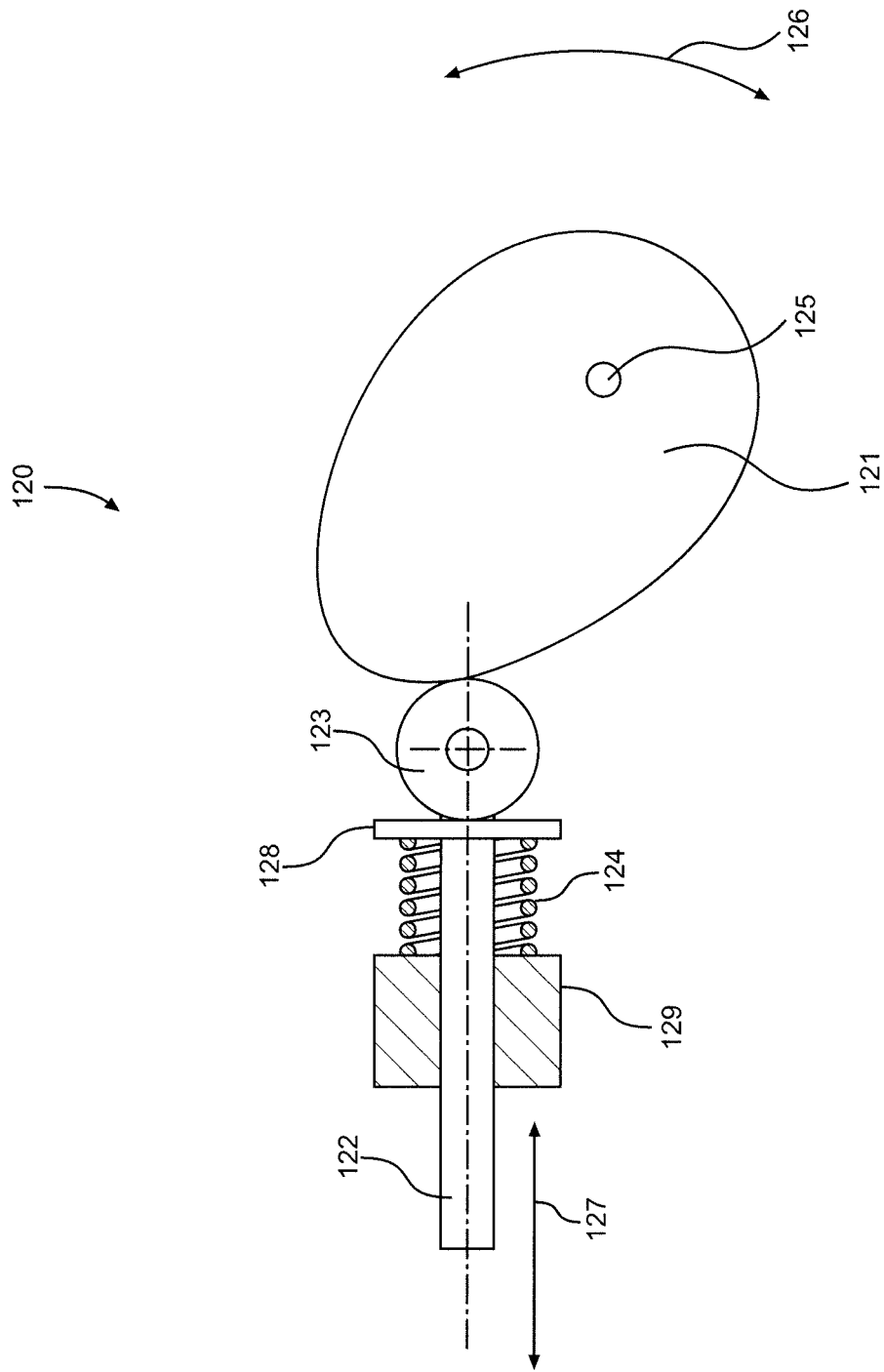
FIG. 1B is a simplified representation of an example spring-closed cam with a translating follower.

Cam devices, such as those used in internal combustion engines to actuate valve position, use a mechanism by which the rotation of the cam is converted into (axial) translation of a follower. In the case of an internal combustion engine, these are spring-closed cams, where the outer surface of the rotating oblong cam displaces and pushes the follower away from the cam against a spring, with the spring then closing the valve when the cam no longer displaces the follower. An example spring-closed cam with an axial follower is shown in FIG. 1B, with a mechanism 120 having a cam 121, a spring 124, and a follower 122. Follower 122 has a roller 123 and a spring retainer 128, with spring 124 being compressed between spring retainer 128 and a fixed surface 129. As cam 121 rotates in a direction 126 about an axle 125, the surface of cam 121 is pressed against roller 123 by the rotation of cam 121 or by the force exerted by spring 124, resulting in translation of follower 122 in a direction 127.

Figure 1C:
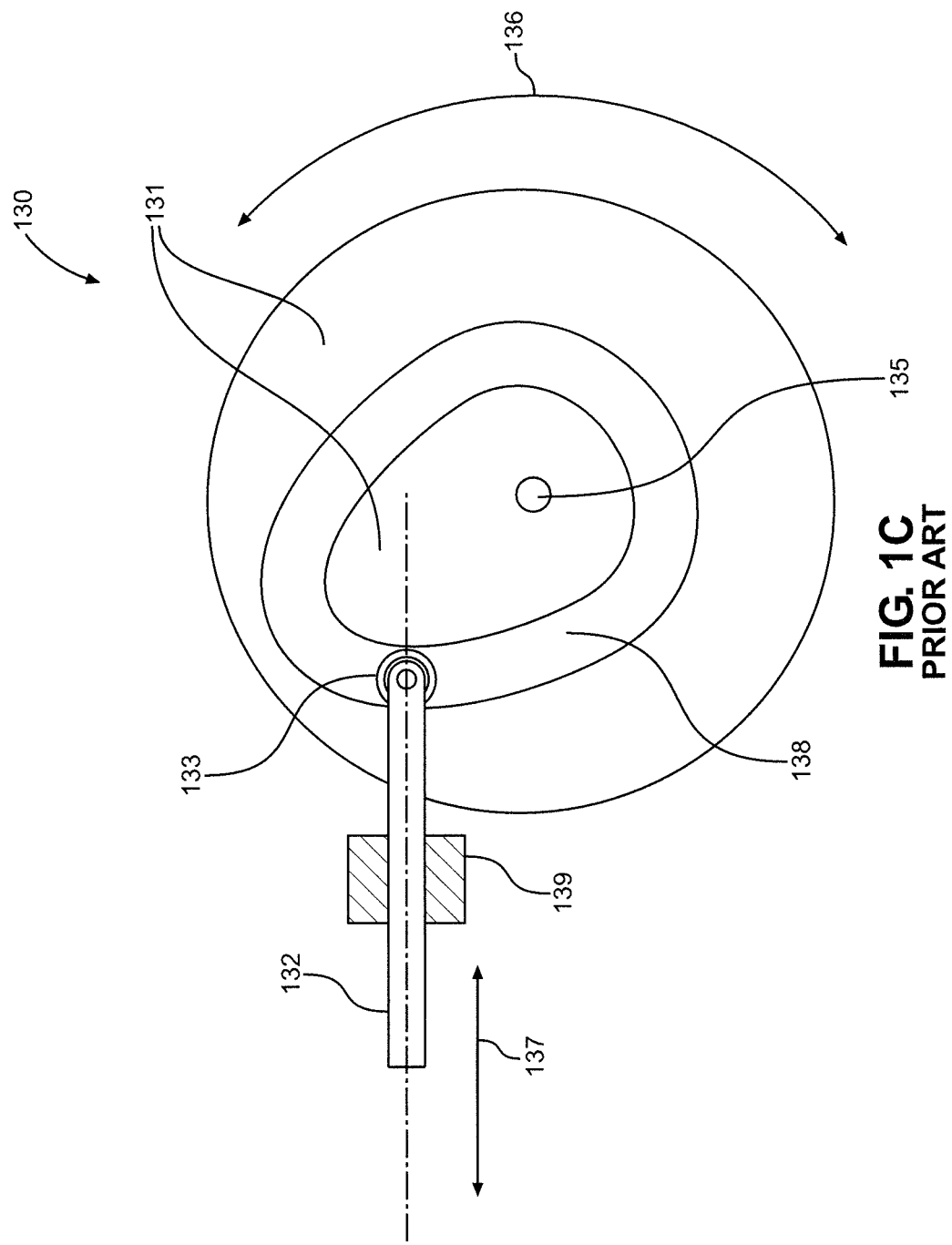
FIG. 1C is a simplified representation of an example form-closed cam with a translating follower.
Figure 2A:
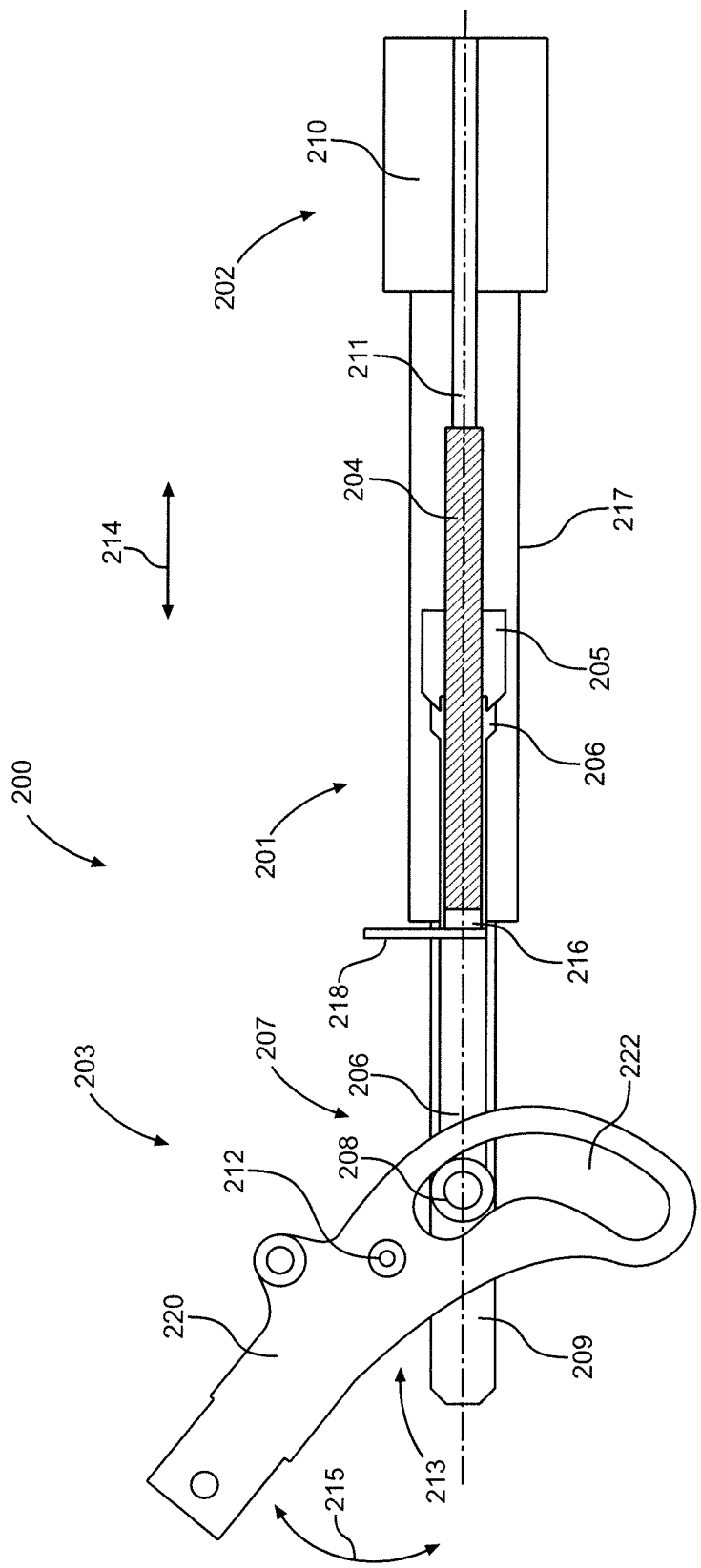
FIG. 2A is a simplified representation of the device of the primary embodiment of this invention, with a ball screw driven by an electric motor effecting the translation of a yoke, and with a roller affixed to this yoke effecting the rotation of a joint cam.
Figure 2B:
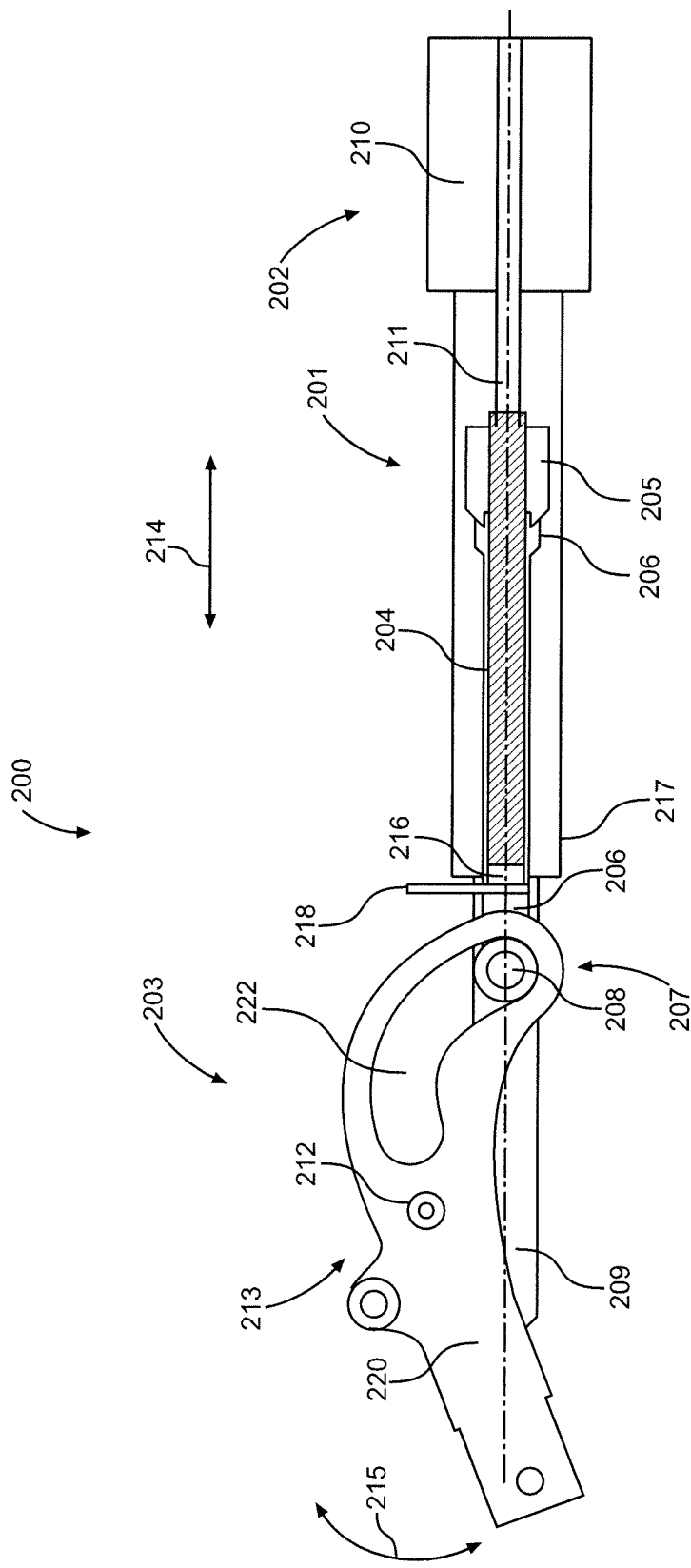
FIG. 2B is a simplified representation of the device of the primary embodiment of this invention, with a ball screw driven by an electric motor effecting the translation of a yoke, with a roller affixed to this yoke effecting the rotation of a joint cam, and with the joint cam being shown in a different position relative to that shown in FIG. 2A.

Form-closed cams have a groove, track, or slot which contacts the follower on two surfaces, allowing the rotating cam to both push the follower away from the cam at one portion of the cam's rotation cycle and pull the follower toward the cam at another portion of the cam's rotation. An example form-closed cam with a translating follower is shown in FIG. 1C, with a mechanism 130 having a cam 131 and a follower 132. Cam 131 has track a 138, and follower 132 has a roller 133, with roller 133 being constrained by track 138. As cam 131 rotates in a direction 136 about an axle 135, the inner and outer surfaces of track 138 are pressed against roller 133 by the rotation of cam 131, resulting in translation of follower 132 relative to a fixed surface 139 in a direction 137. While form-closed cams with translating followers are typically used to impart follower translation as a result of cam rotational movement, conversely, force exerted by the follower on the cam can also be used to affect the rotation/position of the cam.

The primary embodiment of the present invention is represented in FIGS. 2A, 2B, 3A-E and 4. Regarding FIGS. 2A and 2B, simplified drawings of the primary embodiment are shown to demonstrate the function of this actuator device in affecting the rotation of a joint. An actuator 200 includes a ball screw assembly 201, an electric motor assembly 202, a yoke guide 209, and a joint cam 203. Ball screw assembly 201 has a ball screw 204, a ball nut 205, and a yoke 206, with yoke 206 being connected to ball nut 205. Yoke 206 has a cam roller 208 at a yoke roller assembly 207. Joint cam 203 has a cam body 220 and a cam roller track 222, with joint cam 203 pivoting about a joint bearing 212 at a joint 213. Cam roller 208 of yoke roller assembly 207 is constrained within, and can travel along, cam roller track 222. Yoke 206 is constrained within, and can travel along, yoke guide 209 at yoke roller assembly 207. Yoke guide 209 is connected to a ball screw housing 217 and electric motor assembly 202, and the position of joint bearing 212 at joint 213 is fixed relative to yoke guide 209, ball screw housing 217, and electric motor assembly 202. A bearing 216 is attached to ball screw 204 and a ball screw mount 218, with ball screw mount 218 being profiled such as to allow yoke 206 to translate past ball screw mount 218. Ball screw mount 218 is fixed relative to yoke guide 209 and ball screw housing 217. Actuator 200 effects movement of joint cam 203 about joint 213 as an electric motor 210 rotates a shaft 211, causing rotation of the attached ball screw 204, and resulting in translation of ball nut 205 and yoke 206 in a direction 214. As yoke 206 translates along yoke guide 209, cam roller 208 applies force to cam body 220 along cam roller track 222, causing movement of cam roller 208 along cam roller track 222 and rotation of joint cam 203 in a direction 215 at joint bearing 212. The profile of the actuator cam allows for varying degrees of mechanical advantage to be generated in a low-bulk actuator device and for this mechanical advantage to be varied over the actuator stroke (e.g., the actuator can have a 1.5-inch moment arm at full extension and a 0.75-inch moment arm at full flex). Alternatively, the actuator can produce a consistent mechanical advantage over the entire actuator stroke.

Figure 3A:
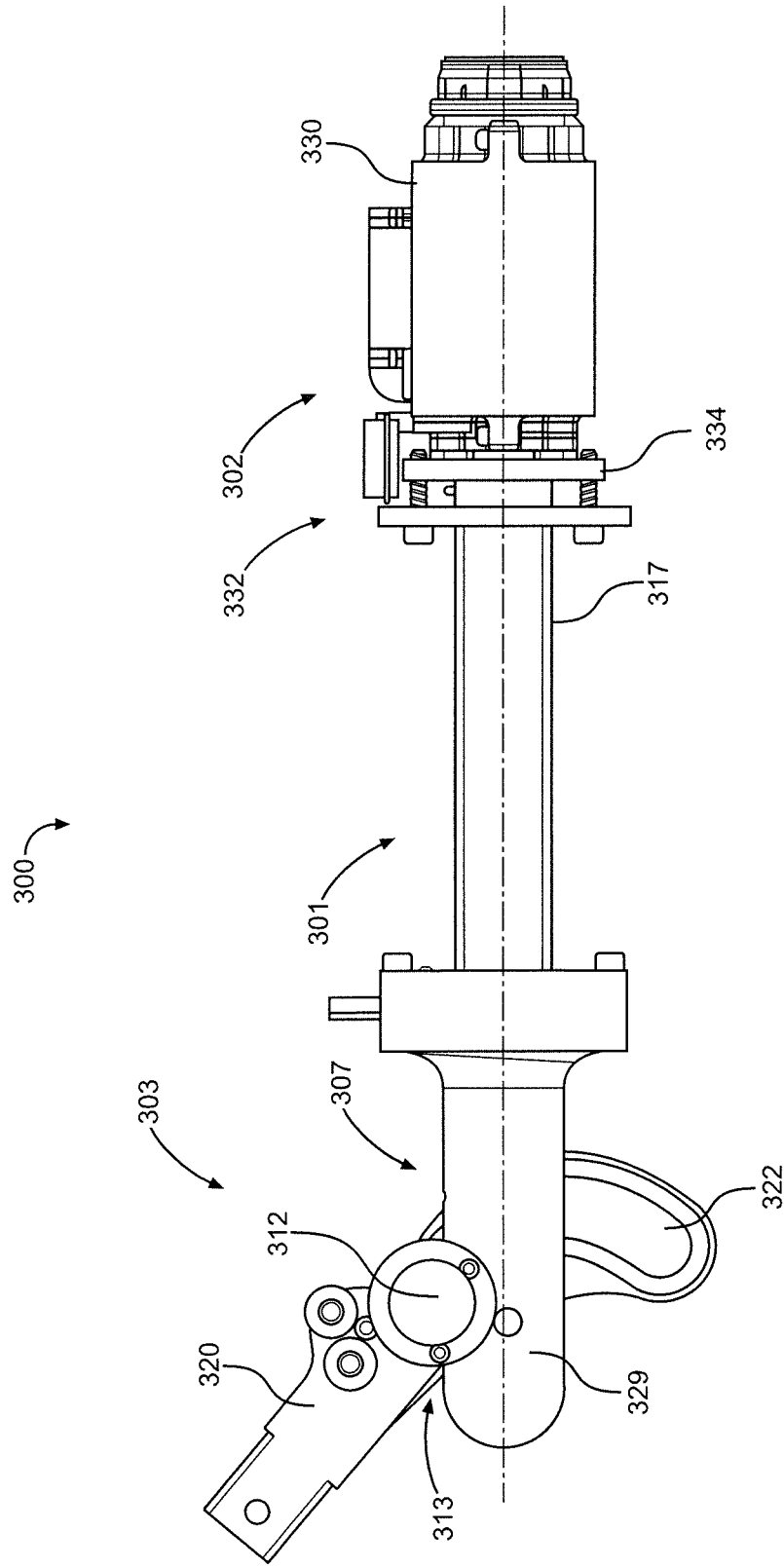
FIG. 3A is a side view of the device of the primary embodiment.
Figure 3B:
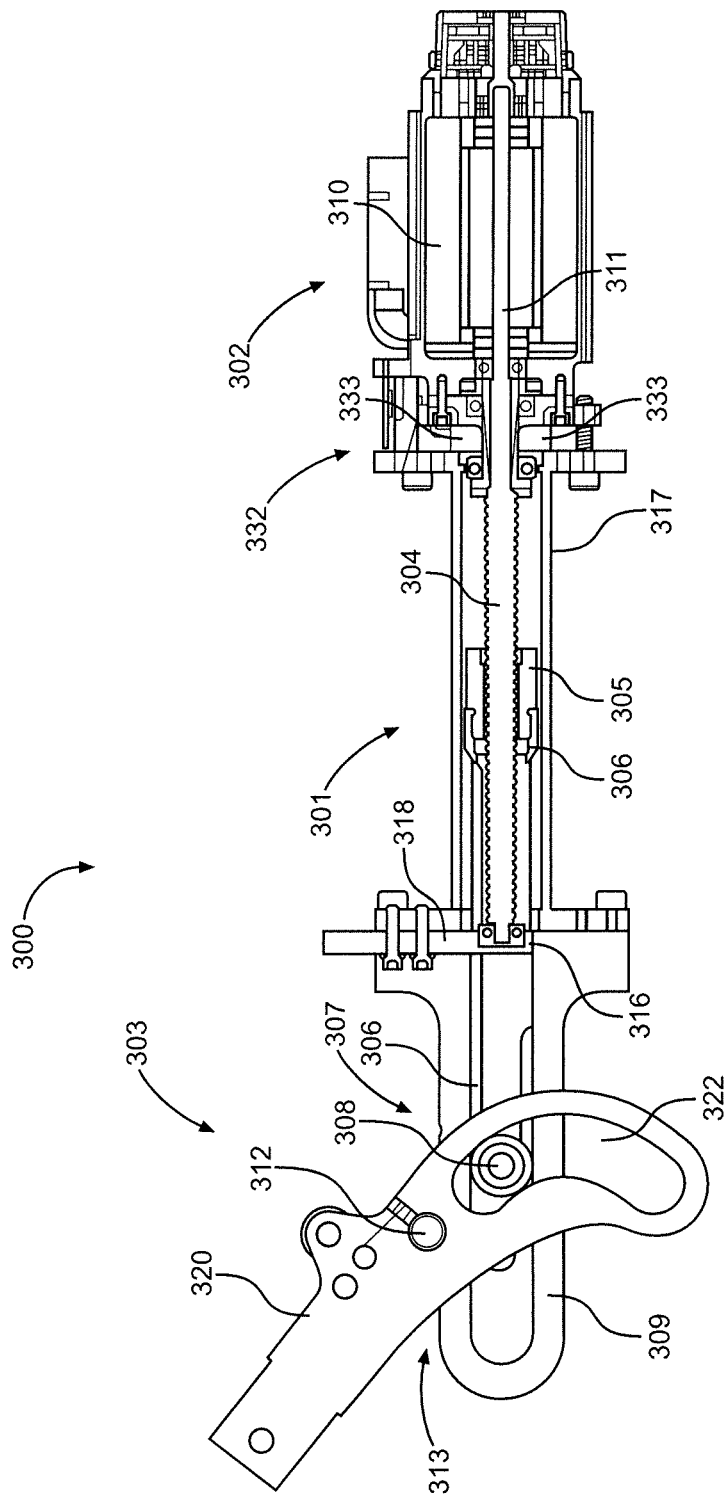
FIG. 3B is a cutaway side view of the device of the primary embodiment.
Figure 3C:
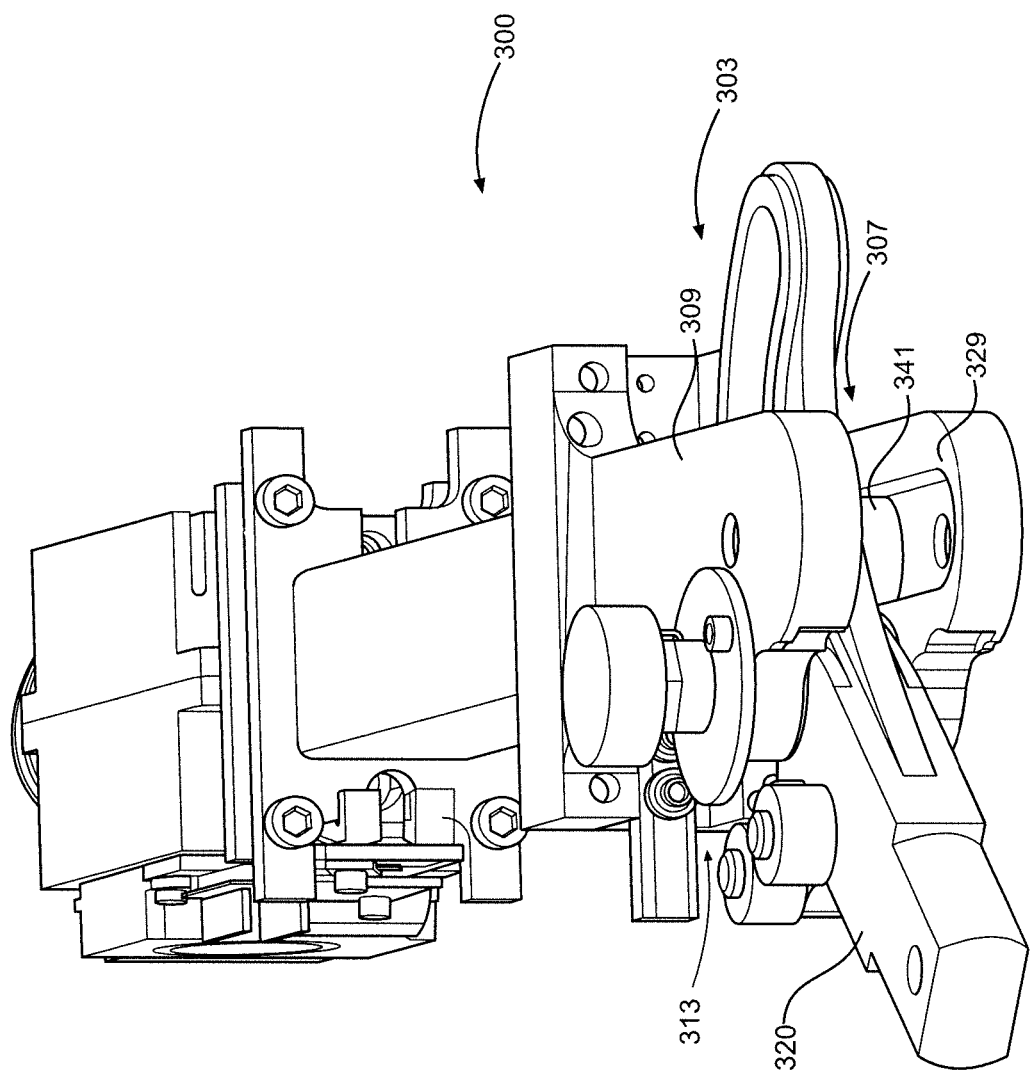
FIG. 3C is a perspective view of the device of the primary embodiment.
Figure 3D:
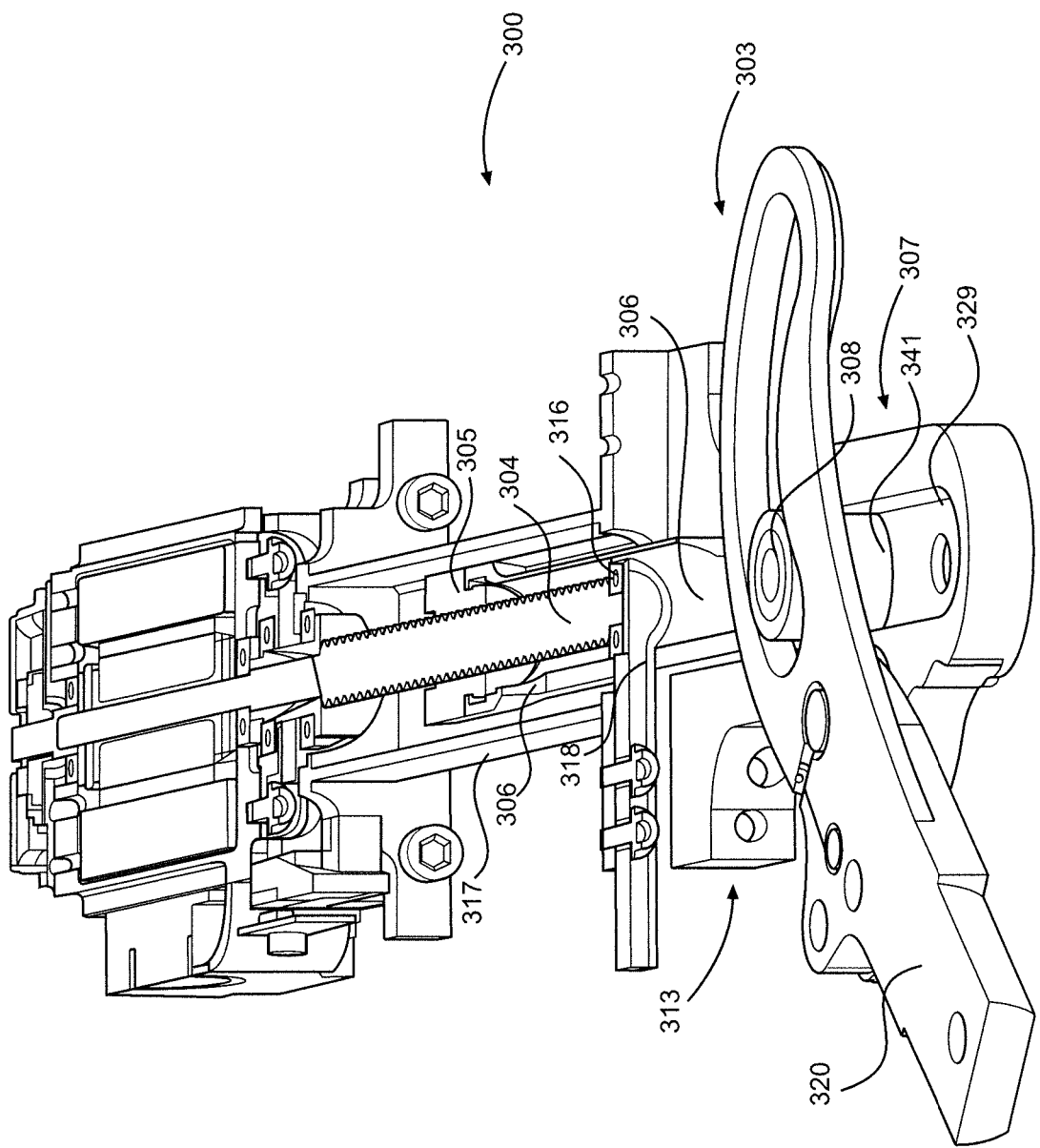
FIG. 3D is a cutaway perspective view of the device of the primary embodiment.
Figure 3E:
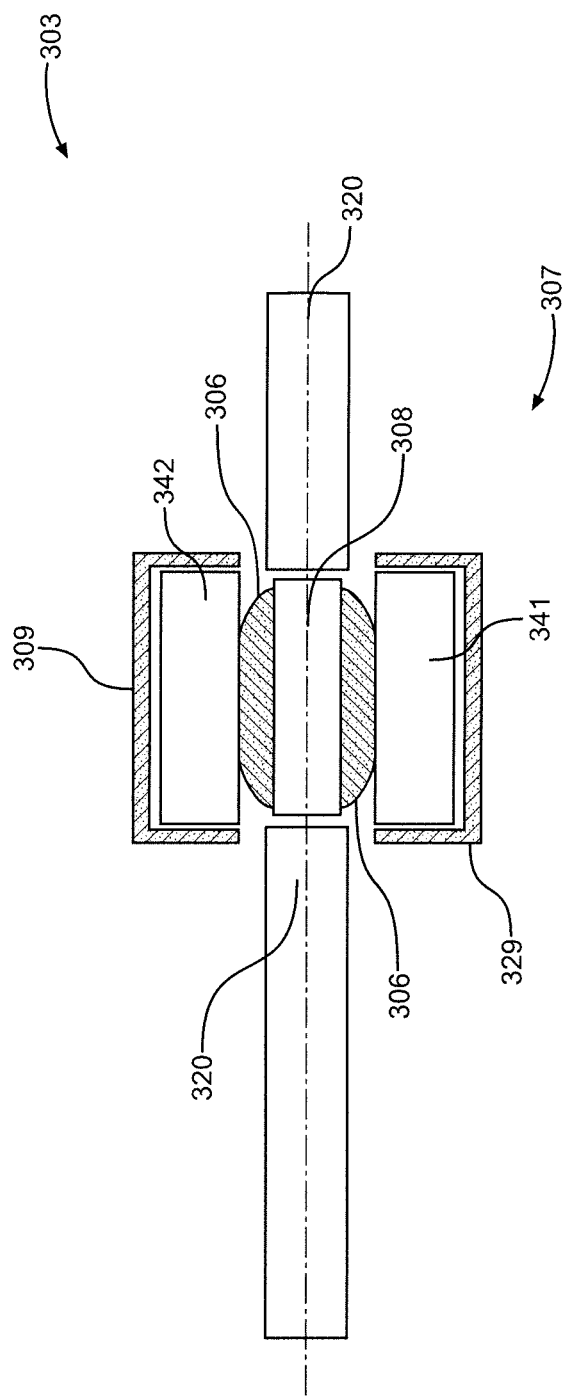
FIG. 3E is a simplified axial sectional view of the joint cam, yoke guide, and yoke roller assembly interface within the device of the primary embodiment.

Regarding FIGS. 3A-E, the device of the primary embodiment is shown, with an actuator 300 including an electric motor assembly 302, a load cell assembly 332, a joint cam 303, an outer yoke guide 309, an inner yoke guide 329, and a ball screw assembly 301. Electric motor assembly 302 has an electric motor 310, a shaft 311, and a motor housing 330. Load cell assembly 332 has a load cell 333 and a load cell housing 334. Joint cam 303 has a cam body 320 and a cam roller track 322, with joint cam 303 pivoting about a joint bearing 312 at a joint 313. The axis of rotation of joint 313 passes through and is fixed relative to outer yoke guide 309 and inner yoke guide 329. Ball screw assembly 301 has a ball screw 304, a ball nut 305, and a yoke 306, with yoke 306 being connected to ball nut 305 and having a yoke roller assembly 307. Yoke roller assembly 307, shown in a simplified sectional view in FIG. 3E, is comprised of a cam roller 308, yoke 306, an inner guide roller 341, and an outer guide roller 342. Cam roller 308 is constrained within, and can travel along, cam roller track 322, as best seen in FIG. 3B. Yoke 306 is constrained within, and can travel along outer yoke guide 309 and inner yoke guide 329 at yoke roller assembly 307, with outer guide roller 342 and inner guide roller 341 of yoke 306 being constrained within outer yoke guide 309 and inner yoke guide 329, respectively. Outer yoke guide 309 and inner yoke guide 329 are connected to a ball screw housing 317, which is connected to load cell assembly 332, which is connected to electric motor assembly 302. The position of joint bearing 312 at joint 313 is fixed relative to outer yoke guide 309, inner yoke guide 329, ball screw housing 317, load cell assembly 332, and electric motor assembly 302. A bearing 316 is attached to ball screw 304 and a ball screw mount 318, with ball screw mount 318 being profiled such as to allow yoke 306 to translate past ball screw mount 318. Ball screw mount 318 is fixed relative to outer yoke guide 309, inner yoke guide 329, and ball screw housing 317. Load cell assembly 332 is configured such that load cell 333 can detect changes in compressive force at load cell 333 that result from activation of the actuator mechanism and/or movement of the joint cam, with load cell assembly 332 being in communication with the exoskeleton control system. In one prototype of the primary embodiment, the load cell was the FUTEK® (Irvine, Calif.) Model LTH300, a donut load cell, which detects compressive force, although the load cell can be configured, as in this embodiment, to detect bidirectional force (as described in FUTEK® Doc. No. EL1058 for Model LTH300/L2760 Series).

Figure 4:
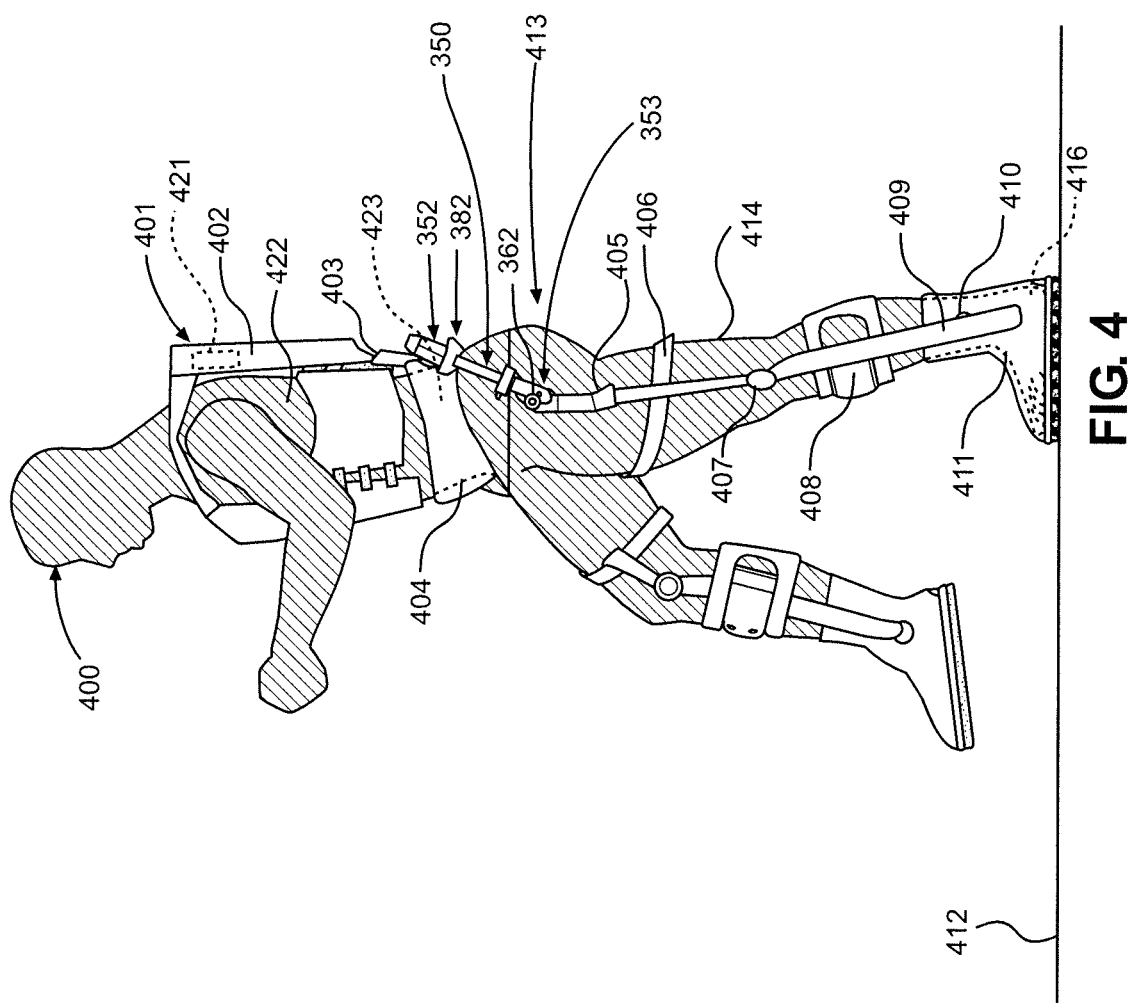
FIG. 4 is a side view of a person wearing an exoskeleton equipped with the device of the primary embodiment at the hip.

In FIG. 4, a person 400 is wearing an exoskeleton 401 while walking on a surface 412. Exoskeleton 401 includes a torso structure 402, an exoskeleton control system 421, a rear support structure 403, a waist structure 404, a hip actuator 350, a hip joint 413, a thigh support 405, a knee joint 407, a shank support 409, an ankle joint 410, and a boot 411. Exoskeleton 401 is coupled to a torso 422 and a waist 423 of person 400 by torso structure 402 and waist structure 404. Exoskeleton 401 is coupled to a leg 414 of person 400 by a thigh coupler 406 and a shank coupler 408 and to a foot 416 of person 400 by boot 411. Exoskeleton control system 421 is in communication with actuator 350, allowing exoskeleton control system 421 to activate an electric motor assembly 352 and apply rotational force to a joint cam 353 about a joint bearing 362 at hip joint 413. The force from joint cam 353 is transmitted to thigh support 405 of exoskeleton 401. In this way, actuator 350 can apply force to and affect the position of hip joint 413 of exoskeleton 401. A load cell assembly 382 is in communication with exoskeleton control system 421, allowing exoskeleton control system 421 to better coordinate the application of force at and movement of actuator 350 and joint 413.

In some embodiments, the components of the actuator are placed differently on the exoskeleton structure. In some embodiments, the actuator is mounted in alternate positions or effects movement of other exoskeleton joints, including, but not limited to, the knee, ankle, or elbow. In some embodiments, the profile of the cam roller track is modified so as to provide differential mechanical advantage, by changing the moment arm of the cam to the ball screw drive mechanism at various joint positions. In some embodiments, bellows completely or partially enclose ball screw mechanism, roller, and/or cam working surfaces to prevent dust or grit contamination of the actuator mechanism.

As an example of the primary embodiment, consider a disabled person wearing an exoskeleton for mobility and rehabilitation purposes outside of a clinical setting, with this exoskeleton providing power to the joints of the exoskeleton and wearer to assist in activities such as walking. If this exoskeleton were equipped with the device of the primary embodiment, the bulk of the exoskeleton hips would be reduced, allowing the person to more easily maneuver the exoskeleton in tight places, such as getting into and out of a car.

As an additional example of the primary embodiment, consider a soldier wearing an armored exoskeleton in a combat environment, with this exoskeleton providing power to the joints of the exoskeleton that are involved in exoskeleton walking, and with the exoskeleton structure supporting the weight of armor. If this exoskeleton were equipped with the device of the primary embodiment, the reduced bulk of the exoskeleton at the hips would reduce the probability that brush or debris would snag on the exoskeleton during movement, improving mobility in constricted spaces. The reduced actuator bulk can also allow the soldier to better utilize cover, as the solider would be able to get closer to walls, objects, or the ground.

Figure 5A:
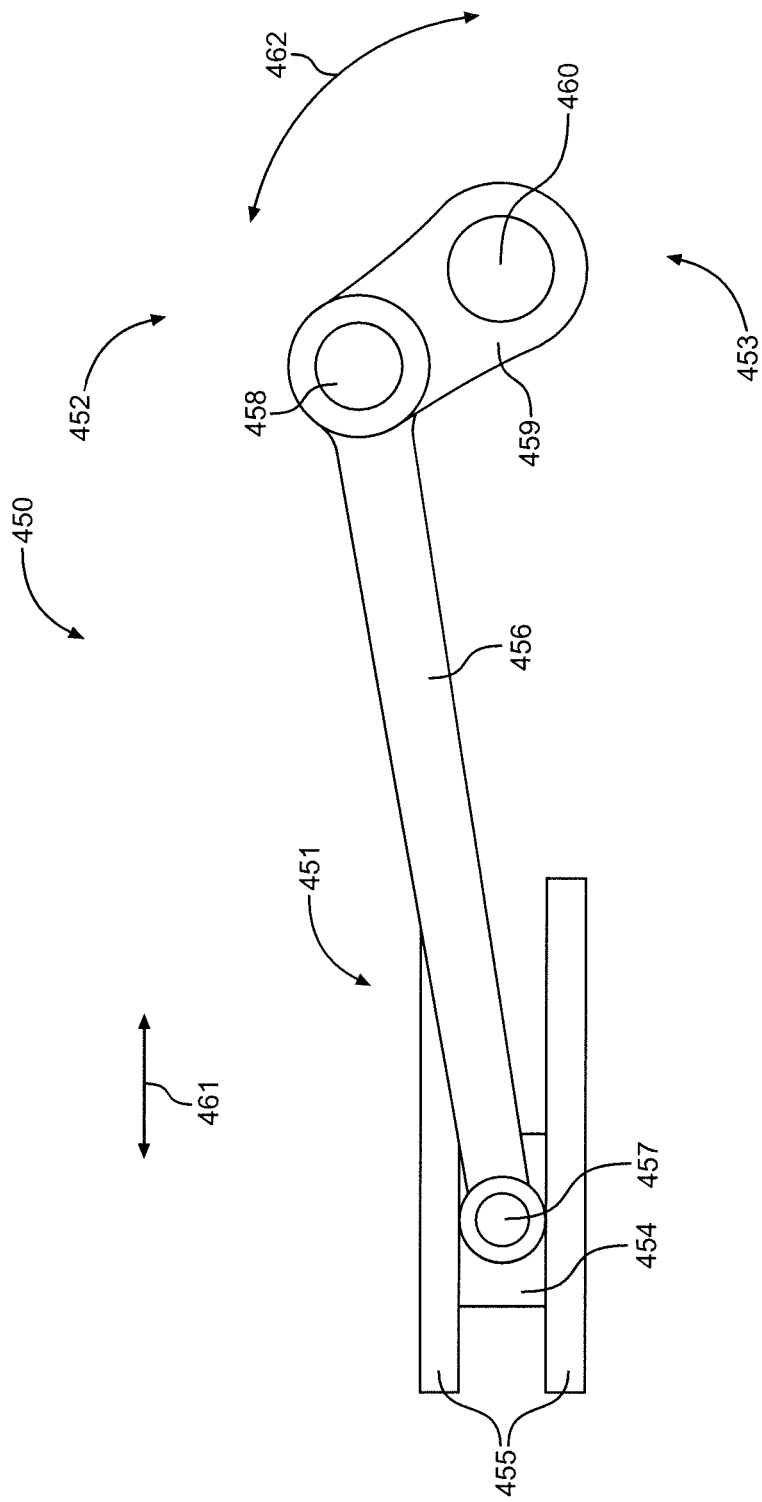
FIG. 5A is a simplified representation of an example in-line slider crank linkage mechanism.

An in-line slider crank linkage mechanism is a device that can convert straight-line motion to rotary motion (e.g., the pistons and crankshaft of an internal combustion engine) or, alternatively, convert rotary motion to straight-line motion (e.g., the electric motor and piston in a reciprocating pump). A simplified example of in-line slider crank linkage is shown in FIGS. 5A and 5B, with a slider crank linkage 450 including a slider assembly 451 and a linkage crank assembly 452. Slider assembly 451 has a slider 454, a slider guide 455, and a slider joint 457, and linkage crank assembly 452 has a linkage 456, a crank 459, a crank joint 458, and an axle 460. The movement of slider 454 is restricted by slider guide 455, allowing only translation of slider 454 in a direction 461. The movement of crank 459 is restricted by axle 460 to rotation about revolute joint 453 in a direction 462. Slider 454 is rotatably connected to linkage 456 at slider joint 457, and linkage 456 is rotatably connected to crank 459 by crank joint 458. As slider 454 translates in direction 461, slider 454 applies force to linkage 456, and linkage 456 transfers force to crank 459, resulting in rotation of crank 459 about revolute joint 453 in direction 462.

The second embodiment of the present invention is represented in FIGS. 6A-G. Regarding FIGS. 6A-D, the device of the second embodiment is shown, with an actuator 500 including an electric motor 502, a load cell assembly 532, a joint crank-linkage assembly 503, an outer yoke guide 509, an inner yoke guide 529, and a ball screw assembly 501. Joint crank-linkage assembly 503 has a joint crank 520, a linkage 551, and a linkage bearing 552, with joint crank 520 pivoting about a joint bearing 512 at joint 513. The axis of rotation of joint 513 passes through and is fixed relative to outer yoke guide 509 and inner yoke guide 529. Joint crank 520 is rotatably connected to linkage 551 at linkage bearing 552. Ball screw assembly 501 has a ball screw 504, a ball nut 505, and a yoke 506, with yoke 506 being connected to ball nut 505 and having a yoke roller assembly 507. Yoke roller assembly 507 is comprised of a yoke-linkage bearing and axle 508, yoke 506, an inner guide roller 541, and an outer guide roller 542. Yoke 506 is rotatably connected to linkage 551 by yoke-linkage bearing and axle 508. Yoke 506 is constrained within, and can travel along, outer yoke guide 509 and inner yoke guide 529, with inner guide roller 541 and outer guide roller 542 of yoke 506 being constrained within inner yoke guide 529 and outer yoke guide 509, respectively. Outer yoke guide 509 and inner yoke guide 529 are connected to a ball screw housing 517, which is connected to load cell assembly 532, which is connected electric motor assembly 502. The position of joint bearing 512 at joint 513 is fixed relative to outer yoke guide 509, inner yoke guide 529, ball screw housing 517, load cell assembly 532, and electric motor 502. A bearing 516 is attached to ball screw 504 and a ball screw mount 518, with ball screw mount 518 being profiled such as to allow yoke 506 to translate past ball screw mount 518. Ball screw mount 518 is fixed relative to outer yoke guide 509, inner yoke guide 529, and ball screw housing 517. Load cell assembly 532 is configured such that a load cell 533 can detect changes in compressive force at load cell 533 that result from activation of the actuator mechanism and/or movement of the joint cam, with load cell assembly 532 being in communication with the exoskeleton control system. In one prototype of the second embodiment, the load cell was the FUTEK® (Irvine, Calif.) Model LTH300, a donut load cell, which detects compressive force, although the load cell can be configured, as in this embodiment, to detect bidirectional force (as described in FUTEK® Doc No. EL1058 for Model LTH300/L2760 Series).

Figure 6A:
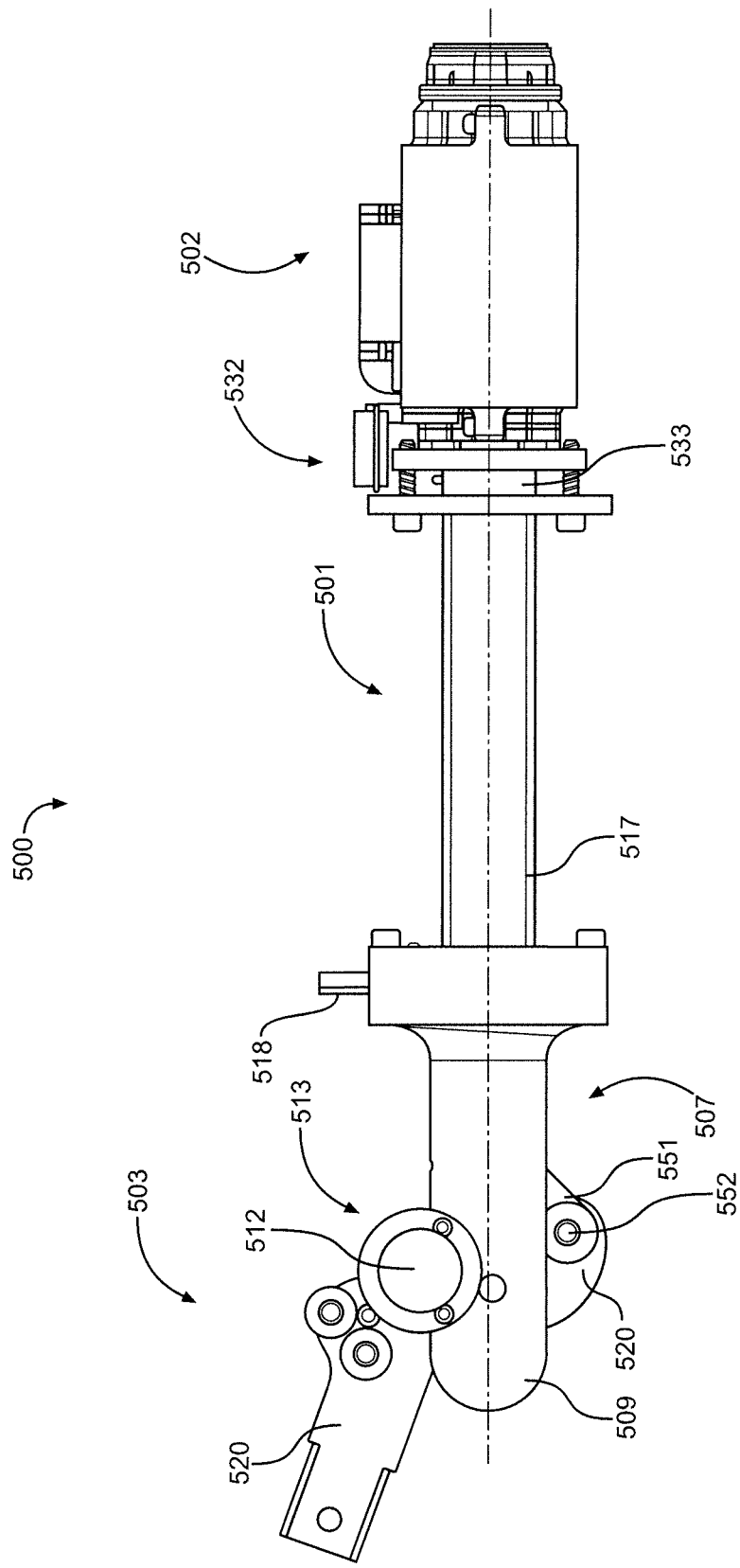
FIG. 6A is a side view of the device of the second embodiment of this invention.
Figure 6B:
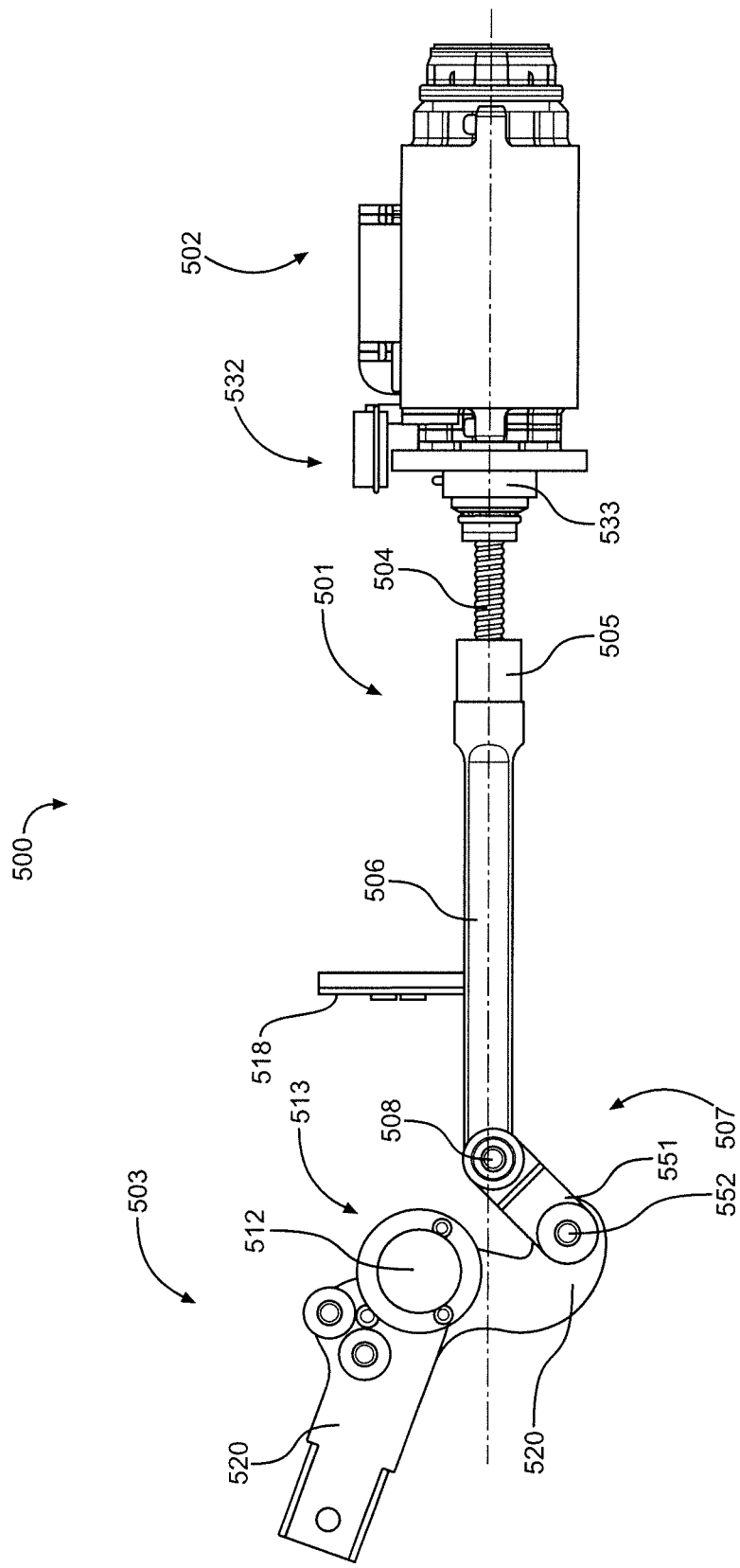
FIG. 6B is a side view of the device of the second embodiment of this invention, showing the internal parts of the device.
Figure 6C:
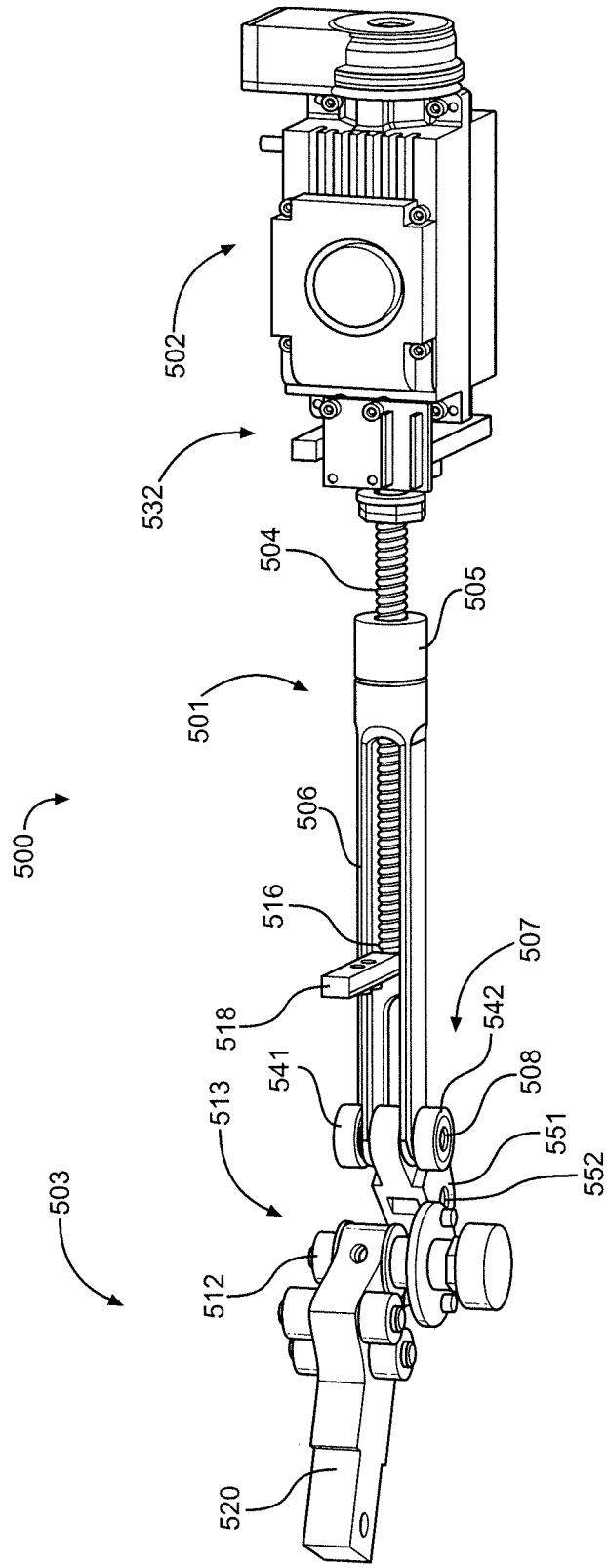
FIG. 6C is a perspective view of the device of the second embodiment of this invention, showing the internal parts of the device.
Figure 6D:
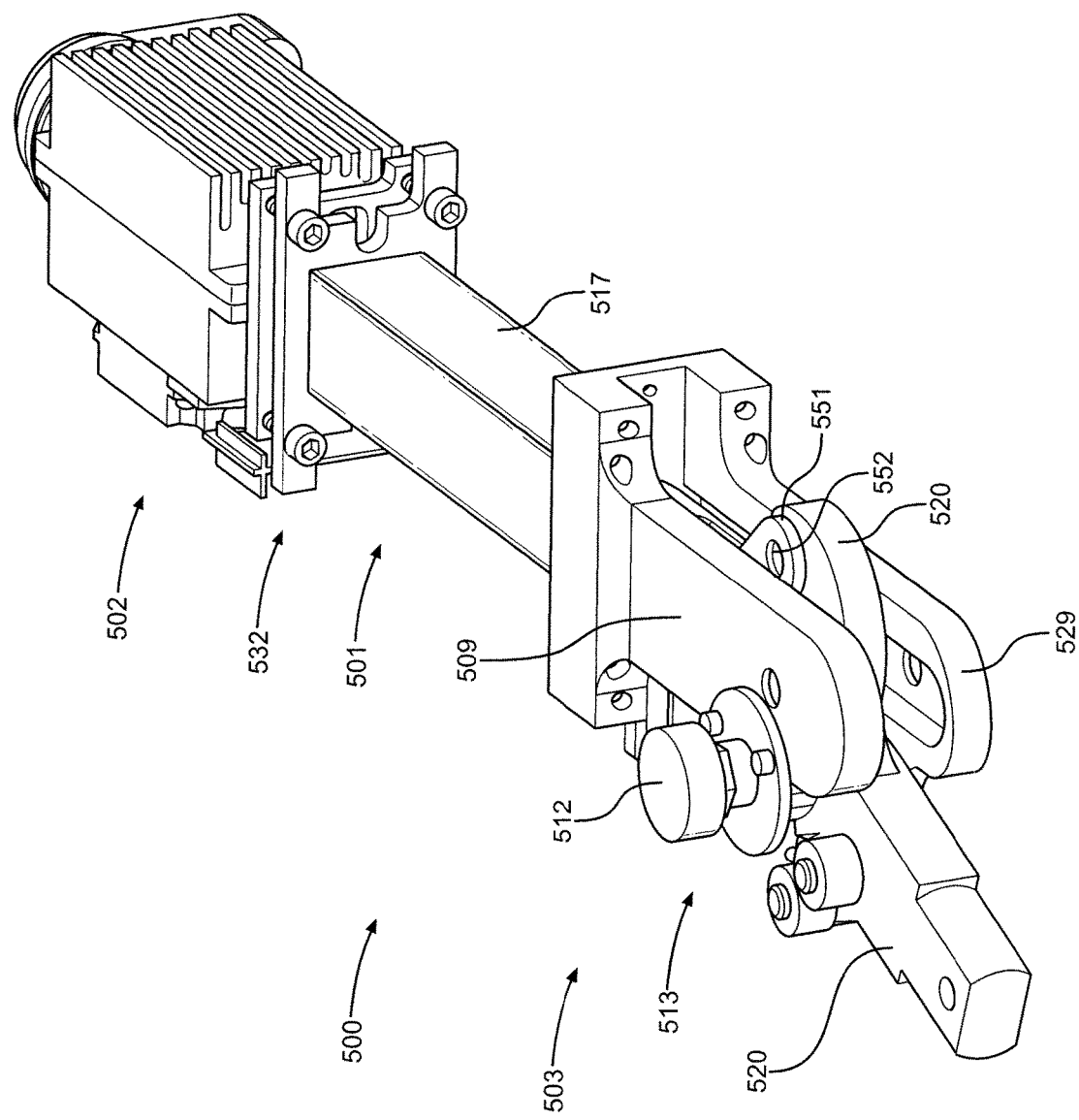
FIG. 6D is a perspective view of the device of the second embodiment of this invention.
Figure 6E:
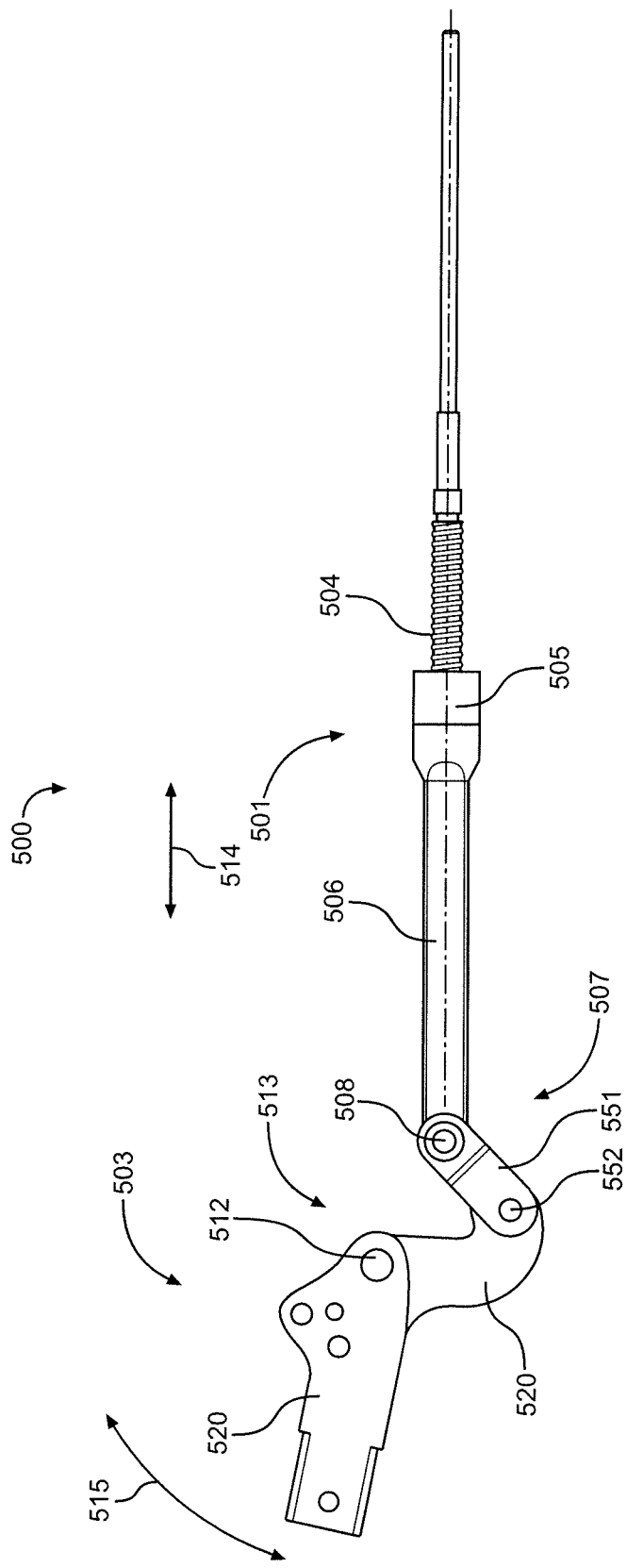
FIG. 6E is a simplified representation of the device of the second embodiment of this invention, with a ball screw driven by an electric motor effecting the translation of a yoke, and with a linkage affixed to this yoke effecting the rotation of a joint cam.
Figure 6F:
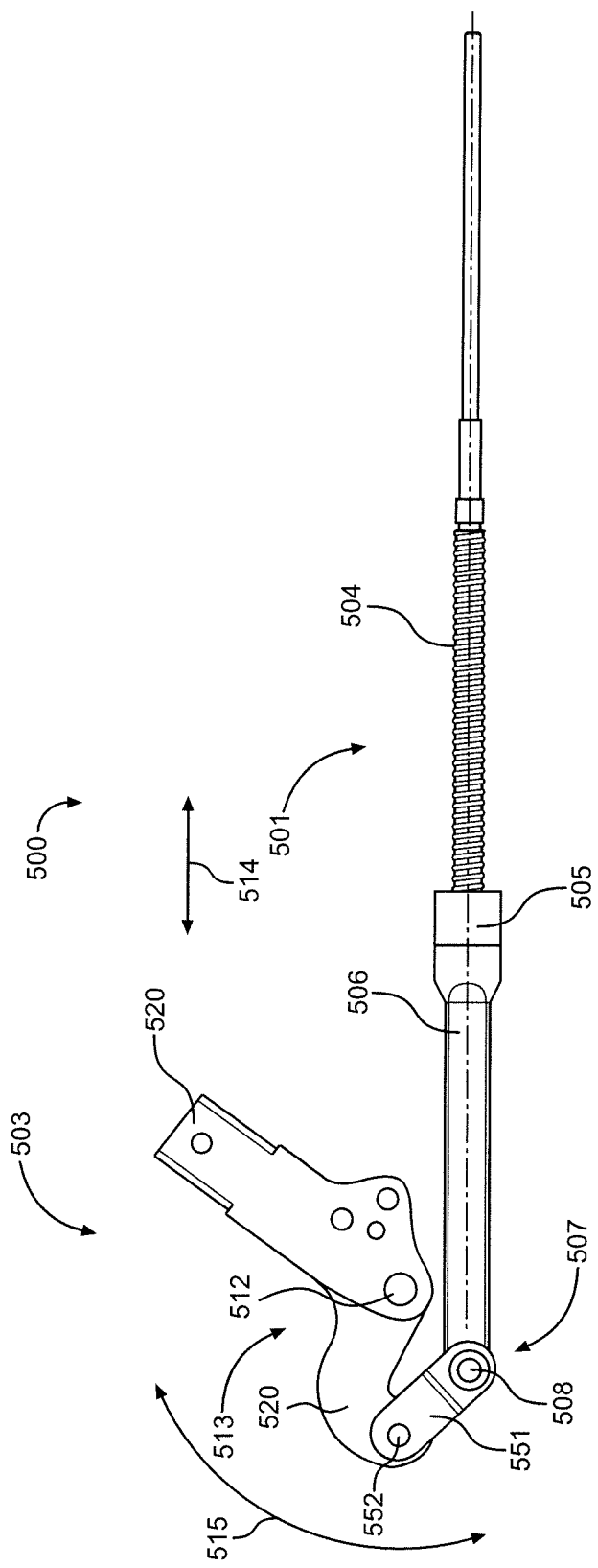
FIG. 6F is a simplified representation of the device of the second embodiment of this invention, with a ball screw driven by an electric motor effecting the translation of a yoke, with a linkage affixed to this yoke effecting the rotation of a joint cam, and with the linkage and joint cam being shown in a different position relative to that shown in FIG. 6E.
Figure 6G:
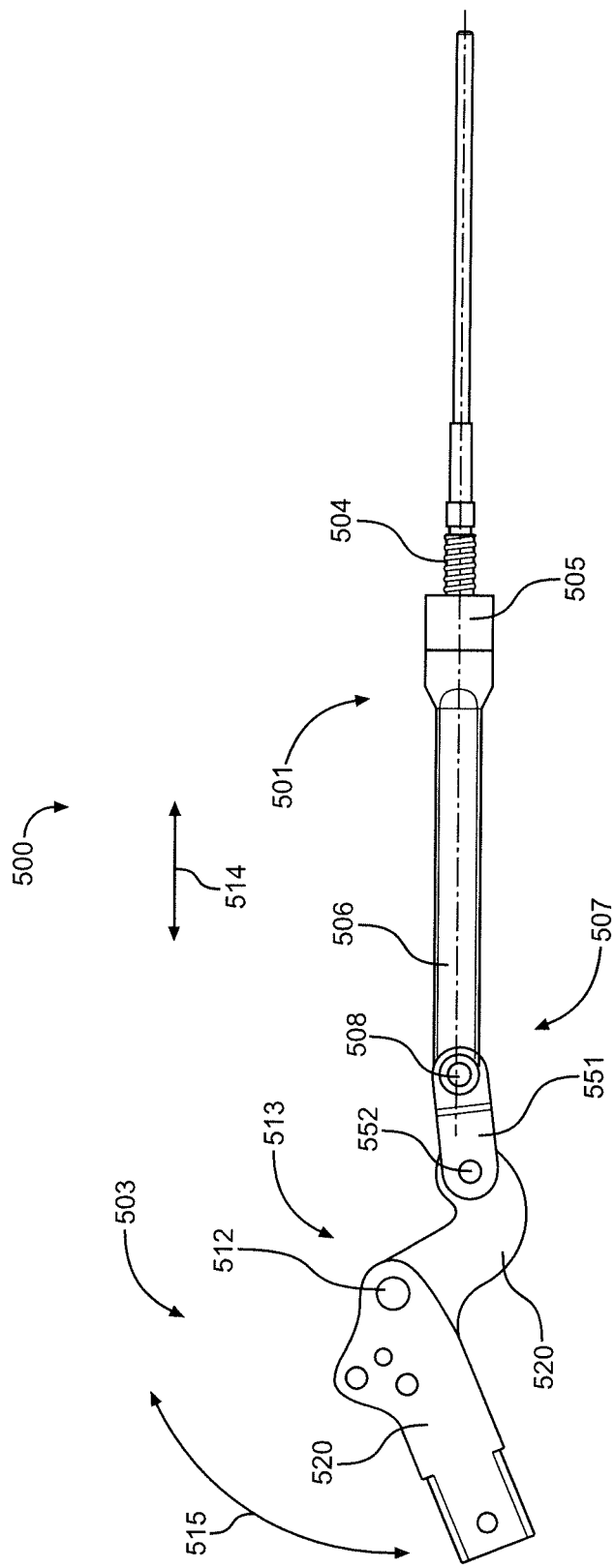
FIG. 6G is a simplified representation of the device of the second embodiment of this invention, with a ball screw driven by an electric motor effecting the translation of a yoke, with a linkage affixed to this yoke effecting the rotation of a joint cam, and with the linkage and joint cam being shown in a different position relative to that shown in FIG. 6E.

Regarding FIGS. 6E-G, a simplified view of the device of the second embodiment is shown, allowing the mechanism of the actuator to be illustrated. As ball nut 505 translates along ball screw 504 in a direction 514 due to the rotation of ball screw 504 by electric motor 502 (not shown in these figures), yoke 506 applies force to linkage 551, and linkage 551 transfers this force to joint crank 520. The force applied to joint crank 520 results in rotation of joint crank 520 about joint 513 in a direction 515. As ball screw 504 can be rotated by electric motor 502 in either direction, bidirectional translation of ball nut 505 can effect bidirectional rotation of joint 513.

Actuator 500 can be configured to provide a variable mechanical advantage over the actuator stroke or a consistent mechanical advantage over the entire actuator stroke. In some embodiments, bellows completely or partially enclose ball screw mechanism, roller, linkage, and/or crank working surfaces to prevent dust or grit contamination of the actuator mechanism. In some embodiments, the actuator is mounted at various exoskeleton positions, or effects the movement of various exoskeleton joints, including, but not limited to, the hip, knee, ankle, or elbow.

As an example of the second embodiment, consider a disabled person wearing an exoskeleton for mobility purposes in a workplace setting, with this exoskeleton providing power to the joints of the exoskeleton and wearer to assist in activities such as walking or standing for extended periods of time. If this exoskeleton were equipped with the device of the second embodiment, the bulk of the exoskeleton joints would be reduced, allowing the person to more easily maneuver the exoskeleton in tight workspaces or in a crowd of people, and allowing the exoskeleton wearer to use a workspace that may be unsuitable for disabled worker access.

In some embodiments, additional sensors, including, but not limited to, pressure sensors or toggle switches, can be in communication with the exoskeleton control system, allowing the exoskeleton to respond to the user. In some embodiments, a ball nut with recirculating balls is replaced with a rolling ring drive, and the ball screw is replaced with a "threadless ball screw" rotating rod drive mechanism. In such an embodiment, the bearings are set at an angle to the threadless rod, with this angle determining the direction and rate of linear motion of the rolling ring drive per revolution of the rod, as driven by the motor. In some embodiments, various types of sensors are used to determine the position of the actuator or joint. In some embodiments, various additional types of sensors are used to detect the forces exerted upon the joint. In some embodiments, the load cell is located between the motor and the ball screw, as illustrated. In other embodiments, the load cell is integrated into the ball nut or yoke.

Based on the above, it should be readily apparent that the present invention provides a device for use in human exoskeletons that allows for the application of bidirectional force upon an exoskeleton joint, effecting bidirectional movement of the joint, with this device being located away from the joint. The device is highly efficient at the transfer of force from an electrical motor, or other power source, to the joint, minimizing energy consumption and/or maximizing force applied to the joint. Also, the device is low profile and adds little bulk at the joint being powered. The device is capable of generating substantial mechanical advantage in a small space. In addition, the device incorporates a robust and simple system for force sensing, allowing the exoskeleton control system to accurately control the position of and the force applied to the joint. The device contains no failure-prone components (e.g., tensile members), allowing for improved exoskeleton wearer safety. While certain preferred embodiments of the present invention have been set forth, it should be understood that various changes or modifications could be made without departing from the spirit of the present invention. In general, the invention is only intended to be limited by the scope of the following claims.

The invention claimed is:

1. An exoskeleton comprising:
a first support configured to be coupled to a wearer of the exoskeleton;
a second support configured to be coupled to the wearer;
a joint connecting the first and second supports, wherein the joint is configured to allow relative rotation between the first and second supports; and
an actuator configured to cause relative rotation between the first and second supports at the joint, the actuator including:
a motor;
a ball screw coupled to and colinear with the motor;
a ball nut coupled to the ball screw; and
a yoke coupled to the ball nut, wherein the motor is configured to cause rotation of the ball screw, the ball screw is configured to cause translation of the ball nut along the ball screw during rotation of the ball screw, and the ball nut is configured to cause translation of the yoke during translation of the ball nut, the actuator further including:
a linkage coupled to the yoke, and
a joint crank coupled to the linkage, wherein the yoke is attached to the ball nut and is configured to move only in translation while acting as a translation slider to cause movement of the linkage during translation of the yoke, and the joint crank is configured such that movement of the linkage causes rotation of the joint crank about the joint, thereby causing relative rotation between the first and second supports at the joint.

2. The exoskeleton of claim 1, wherein the actuator further includes a yoke guide, having an inner yoke guide and an outer yoke guide configured to guide translation of the yoke, wherein the yoke is constrained between the inner yoke guide and the outer yoke guide.

3. The exoskeleton of claim 1, wherein the actuator further includes a load cell configured to detect changes in force at the load cell resulting from activation of the actuator or movement of the joint crank.

4. The exoskeleton of claim 3, wherein the load cell is located between the motor and the ball screw.

5. The exoskeleton of claim 1, wherein the actuator includes the linkage and the joint crank.

6. The exoskeleton of claim 5, wherein:
the actuator further includes a yoke-linkage bearing and a linkage-crank bearing;
the linkage is rotatably coupled to the yoke by the yoke-linkage bearing; and
the joint crank is rotatably coupled to the linkage by the linkage-crank bearing.

7. The exoskeleton of claim 1, wherein a load cell is located between the motor and the ball screw.

8. An actuator configured to cause relative rotation between a first exoskeleton support and a second exoskeleton support at an exoskeleton joint, the actuator comprising:
a motor;
a ball screw coupled to and colinear with the motor;
a ball nut coupled to the ball screw; and
a yoke coupled to the ball nut, wherein the motor is configured to cause rotation of the ball screw, the ball screw is configured to cause translation of the ball nut along the ball screw during rotation of the ball screw, and the ball nut is configured to cause translation of the yoke during translation of the ball nut,
a linkage coupled to the yoke, and
a joint crank coupled to the linkage, wherein the yoke is attached to the ball nut and is configured to move only in translation while acting as a translation slider to cause movement of the linkage during translation of the yoke, and the joint crank is configured such that movement of the linkage causes rotation of the joint crank about the exoskeleton joint, thereby causing relative rotation between the first and second exoskeleton supports at the exoskeleton joint.

9. The actuator of claim 8, further comprising a yoke guide, including an inner yoke guide and an outer yoke guide configured to guide translation of the yoke, wherein the yoke is constrained between the inner yoke guide and the outer yoke guide.

10. The actuator of claim 8, further comprising a load cell configured to detect changes in force at the load cell resulting from activation of the actuator or movement of the joint crank.

11. The actuator of claim 8, further comprising a yoke-linkage bearing and a linkage-crank bearing, wherein the linkage is rotatably coupled to the yoke by the yoke-linkage bearing, and the joint crank is rotatably coupled to the linkage by the linkage-crank bearing.

12. The actuator of claim 8, wherein a load cell is located between the motor and the ball screw.

13. A method of actuating a joint of an exoskeleton including a first support configured to be coupled to a wearer of the exoskeleton, a second support configured to be coupled to the wearer, and an actuator, wherein the joint connects the first and second supports, the joint is configured to allow relative rotation between the first and second supports, and the actuator is configured to cause relative rotation between the first and second supports at the joint, the method comprising:
causing rotation of a ball screw with a motor, wherein the ball screw is coupled to and collinear with the motor;
causing translation of a ball nut along the ball screw by rotating of the ball screw, wherein the ball nut is coupled to the ball screw; and causing translation of a yoke, attached to the ball nut and configured to move only in translation while acting as a translation slider, by translating the ball nut, wherein the yoke is coupled to the ball nut, the method further comprising:

causing movement of a linkage by translating the yoke, wherein the linkage is coupled to the yoke, and causing rotation of a joint crank about the joint by moving the linkage, wherein the joint crank is coupled to the linkage, thereby causing relative rotation between the first and second supports at the joint.

14. The method of claim 13, further comprising measuring a load between the motor and the ball screw with a load cell located between the motor and the ball screw.

\* \* \* \* \*